US010589622B2

United States Patent
Amano et al.

(10) Patent No.: US 10,589,622 B2
(45) Date of Patent: Mar. 17, 2020

(54) FUEL TANK HAVING A SUB-TANK PROVIDED ON THE INSIDE OF THE FUEL TANK BODY

(71) Applicant: TOYOTA JIDOSHA KABUSHIKI KAISHA, Toyota-shi (JP)

(72) Inventors: Shinsuke Amano, Okazaki (JP); Nobuhiro Funahashi, Kitanagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 148 days.

(21) Appl. No.: 15/799,401

(22) Filed: Oct. 31, 2017

(65) Prior Publication Data

US 2018/0118018 A1    May 3, 2018

(30) Foreign Application Priority Data

Nov. 2, 2016    (JP) .................................. 2016-215588

(51) Int. Cl.
*B60K 15/03*    (2006.01)
*B60K 15/077*    (2006.01)

(52) U.S. Cl.
CPC ........ *B60K 15/03006* (2013.01); *B60K 15/03* (2013.01); *B60K 2015/03111* (2013.01); *B60K 2015/03118* (2013.01); *B60K 2015/03171* (2013.01); *B60K 2015/0777* (2013.01)

(58) Field of Classification Search
CPC .......................... B60K 15/03006; B60K 15/03; B60K 15/077; B65D 1/24; B65D 25/04; B65D 25/08

USPC ........ 220/563, 564, 562, 23.89, 23.83, 553, 220/528; 137/574
See application file for complete search history.

(56) References Cited

U.S. PATENT DOCUMENTS

| | | | |
|---|---|---|---|
| 5,221,021 A | 6/1993 | Danna | |
| 6,138,859 A | 10/2000 | Aulph et al. | |
| 9,266,427 B2 | 2/2016 | Hill et al. | |
| 2007/0028968 A1* | 2/2007 | Sanderson | B62D 5/062 137/574 |
| 2011/0139128 A1 | 6/2011 | Zhang et al. | |
| 2012/0145132 A1 | 6/2012 | White | |
| 2013/0192702 A1 | 8/2013 | Chiasson et al. | |
| 2013/0257457 A1 | 10/2013 | Kato | |

(Continued)

FOREIGN PATENT DOCUMENTS

| | | |
|---|---|---|
| CN | 102414042 A | 4/2012 |
| CN | 103534076 A | 1/2014 |

(Continued)

*Primary Examiner* — Robert J Hicks
(74) *Attorney, Agent, or Firm* — Oblon, McClelland, Maier & Neustadt, L.L.P.

(57) ABSTRACT

A fuel tank includes: a tank body including a bottom wall, a lateral wall and an upper wall, the tank body storing fuel in an interior surrounded by the bottom wall, the lateral wall and the upper wall; and a sub-tank storing a part of the fuel, the sub-tank including a wall portion, an opening portion and a post portion, the wall portion standing on the bottom wall and extending toward the upper wall. The opening portion is provided in the wall portion and is a portion in which the fuel flows. The post portion is provided integrally with the wall portion. The post portion is extended along a height direction of the wall portion from the bottom wall and is joined to the bottom wall and the upper wall.

6 Claims, 11 Drawing Sheets

(56) References Cited

U.S. PATENT DOCUMENTS

2015/0328981 A1* 11/2015 Cragel ................. B60K 15/077
　　　　　　　　　　　　　　　　　　　　　220/563
2018/0065475 A1* 3/2018 Amano ............ B60K 15/03177

FOREIGN PATENT DOCUMENTS

| DE | 3131040 A1 | 3/1983 |
| --- | --- | --- |
| DE | 10 2013 017 002 A1 | 4/2015 |
| DE | 10 2016 219 539 A1 | 4/2018 |
| EP | 3 238 973 A1 | 11/2017 |
| JP | 58-60523 U | 4/1983 |
| JP | 2643436 | 8/1997 |
| JP | 2008-30642 | 2/2008 |
| JP | 2011-236752 | 11/2011 |
| JP | 2016-101903 | 6/2016 |
| WO | WO 2012/139961 A1 | 10/2012 |
| WO | WO 2015/055462 A1 | 4/2015 |

* cited by examiner

FUEL TANK HAVING A SUB-TANK PROVIDED ON THE INSIDE OF THE FUEL TANK BODY

INCORPORATION BY REFERENCE

The disclosure of Japanese Patent Application No. 2016-215588 filed on Nov. 2, 2016 including the specification, drawings and abstract is incorporated herein by reference in its entirety.

BACKGROUND

1. Technical Field

The disclosure relates to a fuel tank.

2. Description of Related Art

Japanese Patent Application Publication No. 2011-236752 discloses a fuel tank in which a sub-tank is fixed to a bottom portion. The sub-tank is configured as a container for storing fuel around a fuel pump.

SUMMARY

In a fuel tank in which the sub-tank is provided on the inside of a tank body, when the pressure (internal pressure) on the inside of the tank body is a positive pressure or a negative pressure relative to atmospheric pressure, there is a possibility that the sub-tank is inclined by the inclination of a bottom wall of the tank body and it becomes difficult to hold the fuel in the sub-tank. Here, it is conceivable to adopt a configuration of suppressing the deformation of the tank body by providing a pole on the inside of the tank body. However, in this configuration, since a different member from the sub-tank is provided on the inside of the tank body, the number of components increases. Therefore, the structure of the fuel tank is complicated. Thus, in the fuel tank in which the sub-tank is provided on the inside of the tank body, an improvement is required to suppress the deformation of the tank body in a simple structure.

The disclosure provides a fuel tank that can suppress the deformation of the tank body in a simple structure, in a configuration in which the sub-tank is provided on the inside of the tank body.

A fuel tank according to an aspect of the disclosure includes: a tank body including a bottom wall, a lateral wall and an upper wall, the tank body storing fuel in an interior surrounded by the bottom wall, the lateral wall and the upper wall; and a sub-tank storing a part of the fuel, the sub-tank including a wall portion, an opening portion and a post portion. The wall portion stands on the bottom wall and extending toward the upper wall. The opening portion is provided in the wall portion and is a portion in which the fuel flows. The post portion is provided integrally with the wall portion, the post portion is extended along a height direction of the wall portion from the bottom wall and is joined to the bottom wall and the upper wall.

In the aspect, the sub-tank in the interior of the tank body stores some of the fuel. When the internal pressure of the tank body is a positive pressure or a negative pressure relative to atmospheric pressure, the tank body expands or contracts. When the tank body expands or contracts, a tensile force or a compressive force is applied to the post portion joined to the bottom wall and the upper wall, but the post portion resists the tensile force or the compressive force. Therefore, it is possible to suppress the deformation of the tank body. The post portion is formed integrally with the wall portion and is extended along the standing direction of the wall portion, and therefore, it is possible to suppress the deformation of the tank body in a simple structure, compared to a configuration in which the post portion and the wall portion are separately provided.

In the aspect, the post portion may include a fragile portion where an area of a section orthogonal to an extending direction of the post portion is smaller than a section area of parts of the post portion other than the fragile portion.

According to the configuration, in the case where a tensile force or a compressive force in a previously set allowable range is applied to the post portion, the post portion resists the tensile force or the compressive force. On the other hand, in the case where a high load beyond the allowable range is input to the tank body, the fragile portion cannot resist the load so that the fragile portion is broken, when the load is transmitted from the tank body to the post portion. Since the fragile portion is broken in this way in the case where a high load is input to the tank body, an excessive stress is prevented from being concentrated on a joining part between the post portion and the bottom wall and a joining part between the post portion and the upper wall. Thereby, it is possible to suitably maintain the durability of the joining parts between the post portion and the tank body.

In the aspect, the post portion may include a displacement allowing portion configured to allow displacement of the upper wall relative to the bottom wall when a load from the upper wall of the tank body is applied.

According to the configuration, when the load from the upper wall of the tank body is applied and the upper wall is displaced relative to the bottom wall of the tank body, the displacement allowing portion of the post portion allows the displacement of the upper wall relative to the bottom wall. Thereby, an excessive stress is prevented from being concentrated on the joining part between the post portion and the bottom wall and the joining part between the post portion and the upper wall. Therefore, it is possible to suitably maintain the durability of the joining parts between the post portion and the tank body.

In the aspect, the post portion may have a cylindrical shape, and an inflow port into which the fuel in the sub-tank flows may be provided on a wall of the post portion.

According to the configuration, the fuel flows into the interior of the post portion through the inflow port, and the fuel is stored also in the interior of the post portion. Therefore, it is possible to increase the amount of the fuel that is stored in the sub-tank, compared to a configuration in which the post portion is solid.

In the aspect, when a direction from the bottom wall toward the upper wall is an upward direction and a direction from the upper wall toward the bottom wall is a downward direction, the post portion may include a flange that is provided at an end portion of the post portion in the upward direction and that is joined to the upper wall.

In the aspect, when a direction from the bottom wall toward the upper wall is an upward direction and a direction from the upper wall toward the bottom wall is a downward direction, the post portion may include a first rib at a portion below the fragile portion and a second rib at a portion above the fragile portion, the first rib extending in an up-down direction, the second rib extending in the up-down direction.

In the aspect, when a direction from the bottom wall toward the upper wall is an upward direction and a direction from the upper wall toward the bottom wall is a downward direction, the fragile portion may be positioned above an upper edge portion of the wall portion.

In the aspect, a plurality of post portions may be provided on the wall portion in the fuel tank.

In the configuration, the plurality of post portions are formed on the wall portion. Therefore, when the tank body expands or contracts, it is possible to suppress the deformation of the tank body, compared to a configuration in which a single post portion resists the tensile force or the compressive force.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

In the following, a fuel tank 10 according to a first embodiment will be described based on FIG. 1 to FIG. 4B. The fuel tank 10 is mounted in an unillustrated vehicle. In each diagram, an arrow FR indicates a vehicle forward direction, an arrow W indicates a vehicle width direction, and an arrow UP indicates a vehicle upward direction. Hereinafter, when an upward or downward direction is merely described, the upward or downward direction means the upward or downward direction in a vehicle vertical direction. Further, when right or left is merely described, the right or left means the right side or left side in the vehicle width direction in a state where the vehicle is oriented in a travelling direction. A vehicle front-back direction, the vehicle width direction and the vehicle vertical direction are orthogonal to each other.

Figure 1:
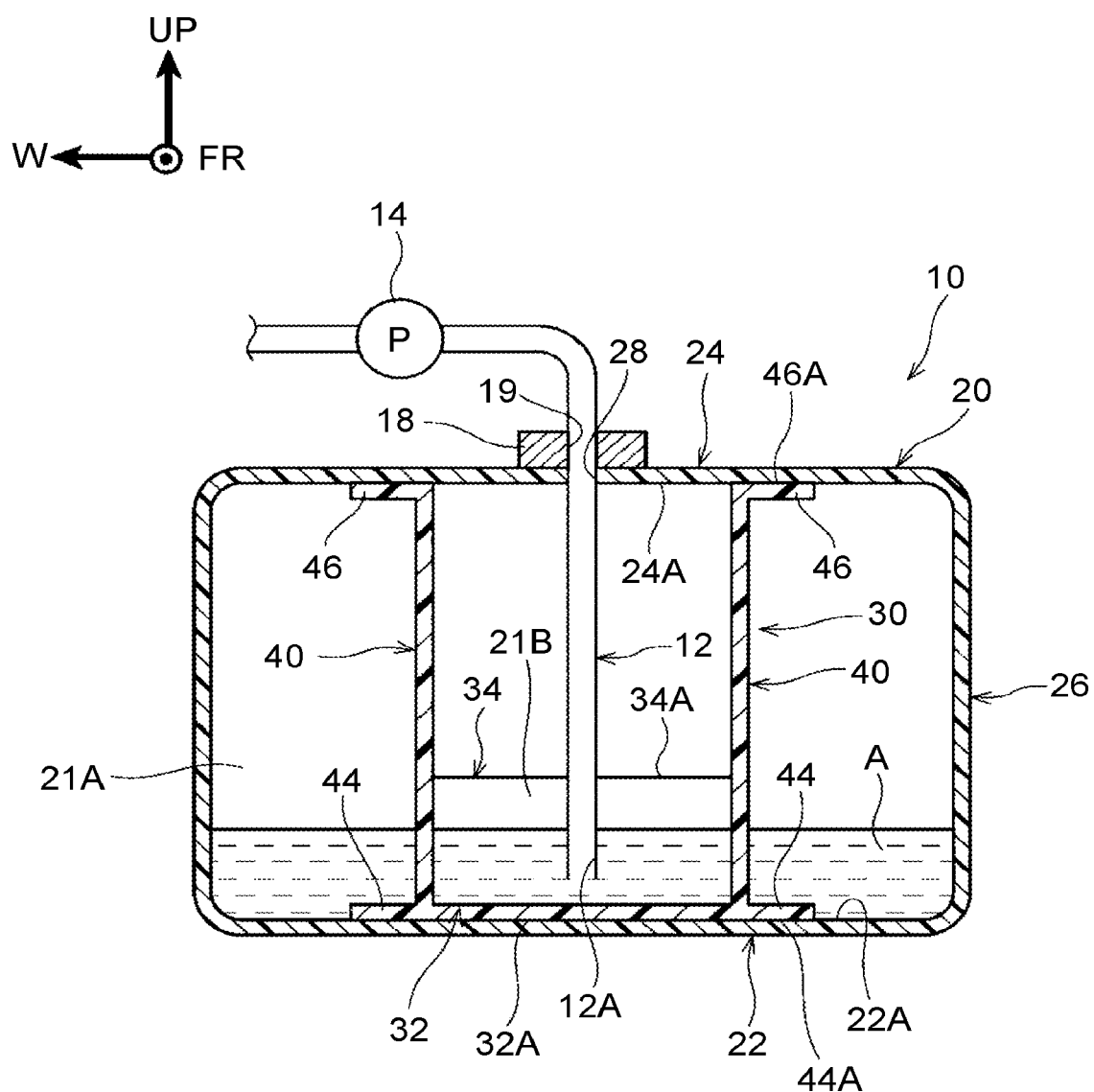
FIG. 1 is a longitudinal sectional view of a fuel tank according to a first embodiment.

The fuel tank 10 shown in FIG. 1 includes a tank body 20 in which a liquid fuel A is stored, and a sub-tank 30 that is provided in the interior of the tank body 20. The fuel tank 10 is provided with a supply pipe 12 and a pump module 14 that feeds the fuel A in the interior of the tank body 20, to an unillustrated engine of the vehicle, through a fuel inlet 12A at the lower end of the supply pipe 12.

[Tank Body]

As an example, the tank body 20 includes a bottom wall 22 and an upper wall 24 that are a pair of wall portions facing each other in the vehicle vertical direction, and a lateral wall 26 that connects an outer edge portion of the bottom wall 22 and an outer edge portion of the upper wall 24 in the vehicle vertical direction, and is formed in a hollow and nearly rectangular parallelepiped shape. In the tank body 20, the fuel A is stored in the interior surrounded by the bottom wall 22, the lateral wall 26 and the upper wall 24. As an example, the tank body 20 is composed of a thermoplastic resin. Further, the tank body 20 is disposed such that a long direction of the tank body 20 is the vehicle width direction and a short direction of the tank body 20 is the vehicle front-back direction.

The bottom wall 22 is extended in the vehicle width direction and the vehicle front-back direction. In other words, the bottom wall 22 is disposed along a nearly horizontal direction. The upper wall 24 is extended in the vehicle width direction and the vehicle front-back direction, and is disposed along a nearly horizontal direction. Further, a through-hole 28 passing in the vehicle vertical direction is formed at a central portion of the upper wall 24 in the vehicle width direction and the vehicle front-back direction. A lid member 18 is provided on the upper side of the through-hole 28 of the upper wall 24. The lid member 18 covers the through-hole 28. On the lid member 18, a through-hole 19 passing in the vehicle vertical direction is formed. The supply pipe 12 is inserted into the through-hole 19 and the through-hole 28, with no space. The fuel inlet 12A of the supply pipe 12 is disposed at a position that is higher than a lower wall 32 of the sub-tank 30 described later and that is lower than an upper surface of a wall portion 34, at an interval from the lower wall 32.

[Sub-Tank]

Figure 2:
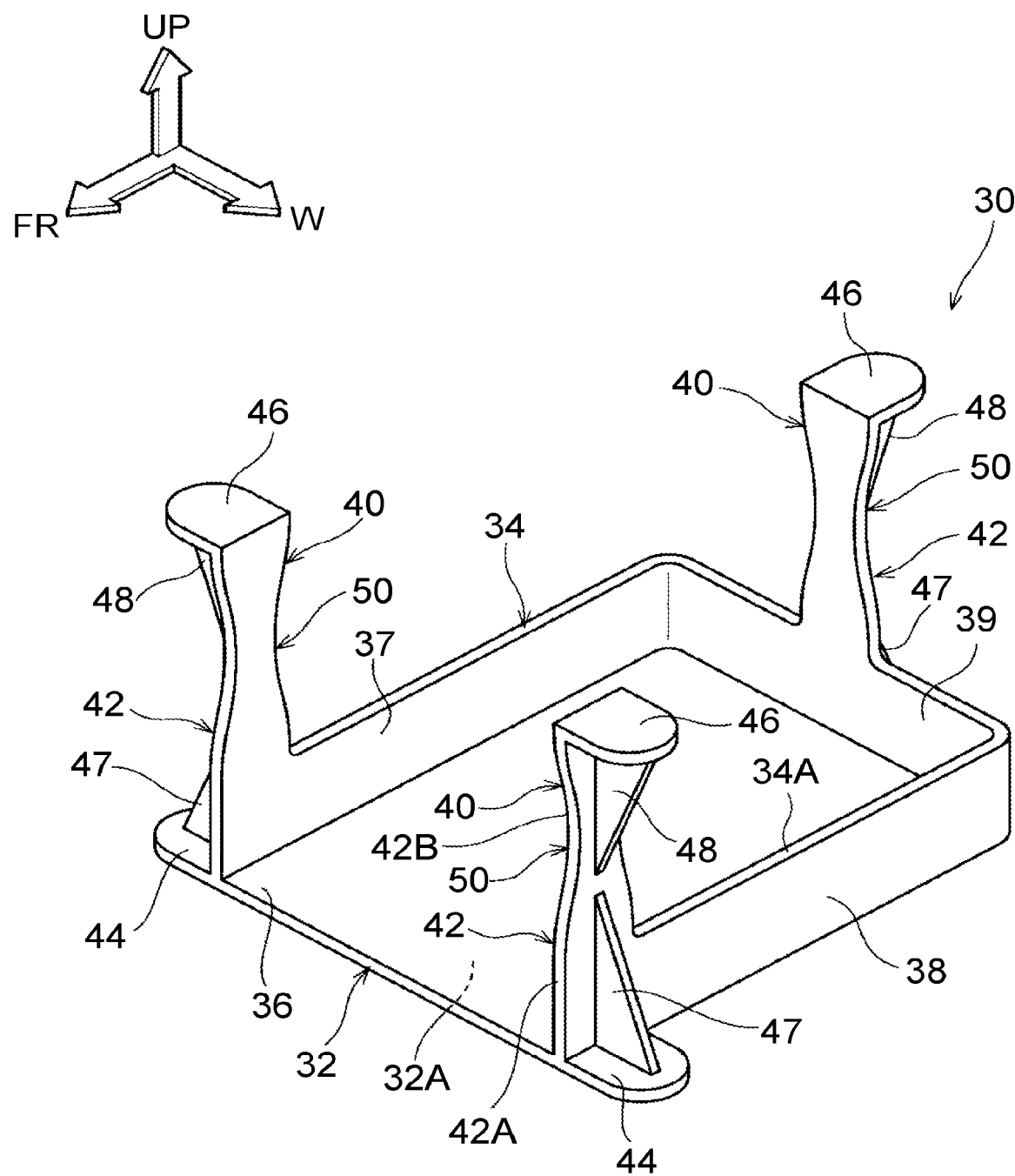
FIG. 2 is a perspective view of a sub-tank according to the first embodiment.

As an example, the sub-tank 30 shown in FIG. 2 is composed of a thermoplastic resin, and includes the lower wall 32, the wall portion 34 standing on an outer edge portion of the lower wall 32, an opening portion 36 formed in the wall portion 34, and post portions 40 formed on the wall portion 34.

<Lower Wall>

The lower wall 32 is extended in the vehicle width direction and the vehicle front-back direction, and as an example, is formed in a nearly oblong shape in which the length in the vehicle front-back direction is longer than that in the vehicle width direction, as viewed from the vehicle vertical direction. The lower wall 32 is placed on an upper surface 22A (see FIG. 1) of the upper side of the bottom wall 22 in the vehicle vertical direction. In other words, the lower wall 32 is disposed along a nearly horizontal direction. Here, a lower surface 32A of the lower side of the lower wall 32 in the vehicle vertical direction contacts with the upper surface 22A, but is not fixed to the upper surface 22A. That is, between the lower surface 32A and the upper surface 22A, fixing means such as bonding and welding is not used.

<Wall Portion>

The wall portion 34 stands straight along the vehicle vertical direction, in a state where the sub-tank 30 is provided in the interior of the tank body 20 (see FIG. 1). In other words, the wall portion 34 stands on the bottom wall 22 in the interior of the tank body 20. As an example, the wall portion 34 stands along the vehicle vertical direction, at both end portions in the vehicle width direction and a back end portion in the vehicle front-back direction, on the outer edge portion of the lower wall 32.

Specifically, the wall portion 34 is configured by a right wall 37, a left wall 38 and a back wall 39. The wall portion 34 is formed in a nearly U-shape in which the front side in the vehicle front-back direction is opened, as viewed from the vehicle vertical direction. As an example, the heights of the right wall 37, left wall 38 and back wall 39 in the vehicle vertical direction are set so as to be nearly the same height as each other. Further, as an example, the heights of the right wall 37, left wall 38 and back wall 39 in the vehicle vertical direction are about ⅓ of the height of the internal space of the tank body 20 in the vehicle vertical direction (see FIG. 1). Here, a surface of the upper end of the wall portion 34 in the vehicle vertical direction is referred to as an upper end surface 34A.

The right wall 37 is formed in a nearly rectangular shape in which the length in the vehicle vertical direction is shorter than that in the vehicle front-back direction, as viewed from the vehicle width direction. The right wall 37 is extended from the front end of the lower wall 32 to the back end in the vehicle front-back direction. The left wall 38 is formed in a nearly rectangular shape in which the length in the vehicle vertical direction is shorter than that in the vehicle front-back direction, as viewed from the vehicle width direction. The left wall 38 is extended from the front end of the lower wall 32 to the back end in the vehicle front-back direction. The right wall 37 and the left wall 38 face each other in the vehicle width direction.

The back wall 39 is formed in a nearly rectangular shape in which the length in the vehicle vertical direction is shorter than that in the vehicle width direction, as viewed from the vehicle front-back direction. The back wall 39 is extended from the left end of the lower wall 32 to the right end in the vehicle width direction, and is connected to a back end portion of the right wall 37 and a back end portion of the left wall 38.

As shown in FIG. 1, since the wall portion 34 stands in the interior of the tank body 20, a space portion that is in the interior of the tank body 20 and that is below the center in the vehicle vertical direction is partitioned into a main storage portion 21A outside the sub-tank 30 and an auxiliary storage portion 21B inside the sub-tank 30. That is, in the interior of the tank body 20, some of the fuel A is stored in the auxiliary storage portion 21B of the sub-tank 30.

<Opening Portion>

As shown in FIG. 2, the opening portion 36 is configured by a front end portion of the lower wall 32, a front end portion of the right wall 37 and a front end portion of the left wall 38, and is a part formed in a nearly U-shape in which the upper side is opened, as viewed from the vehicle front-back direction. In other words, the opening portion 36 is formed at the front end of the wall portion 34. The opening portion 36 allows the flow (inflow and outflow) of the fuel A (see FIG. 1). In the sub-tank 30, when the height of the liquid surface of the fuel A is lower than the height of the wall portion 34, the fuel A flows into the interior of the sub-tank 30 through the opening portion 36.

<Post Portion>

As an example, the post portions 40 are formed integrally with the wall portion 34, at a front end portion of the right wall 37, a front end portion of the left wall 38 and a central portion of the back wall 39 in the vehicle width direction. That is, as an example, three (a plurality of) post portions 40 are formed. As an example, the three post portions 40 have the same configuration, except difference in disposing angle. Therefore, the description will be made for the post portion 40 formed integrally with the left wall 38, and the description of the other two post portions 40 will be omitted.

As an example, the post portion 40 is configured to include an upstanding portion 42, a lower flange 44 formed at the lower end of the upstanding portion 42 in the vehicle vertical direction, an upper flange 46 formed at the upper end of the upstanding portion 42 in the vehicle vertical direction, and a rib 47 and rib 48 for reinforcement. On the upstanding portion 42, a fragile portion 50 is formed. Details of the fragile portion 50 will be described later.

(Upstanding Portion)

The upstanding portion 42 is a plate-shaped portion having nearly the same thickness as the thickness of the wall portion 34, and is extended along the standing direction of the wall portion 34 (the vehicle vertical direction) Here, the upstanding portion 42 is divided into a lower-side upstanding portion 42A and an upper-side upstanding portion 42B. The lower-side upstanding portion 42A is a part of the upstanding portion 42 that is positioned in a range from the upper surface 22A (see FIG. 1) of the tank body 20 to the upper end surface 34A of the wall portion 34, and is a part where the wall portion 34 and the post portion 40 are integrated. On the other hand, the upper-side upstanding portion 42B is a part that is positioned in a range on the upper side of the upper end surface 34A.

(Lower Flange)

The lower flange 44 is a part that projects from a lower end portion of the lower-side upstanding portion 42A toward the outside of the wall portion 34. The lower flange 44 is formed in a nearly semi-elliptical shape whose major axis direction is the vehicle width direction, as viewed from the vehicle vertical direction. As an example, the thickness of the lower flange 44 in the vehicle vertical direction is nearly the same as the thickness of the lower wall 32 in the vehicle vertical direction.

(Upper Flange)

The upper flange 46 is a part that projects from an upper end portion of the upper-side upstanding portion 42B toward the outside of the upper-side upstanding portion 42B. Similarly to the lower flange 44, the upper flange 46 is formed in a nearly semi-elliptical shape whose major axis direction is the vehicle width direction, as viewed from the vehicle vertical direction. As an example, the size of the upper flange 46 is nearly the same as the size of the lower flange 44. In other words, as an example, the thickness of the upper flange 46 in the vehicle vertical direction is nearly the same as the thickness of the lower flange 44 in the vehicle vertical direction.

As an example, a lower surface 44A shown in FIG. 1, which is the surface on the lower side of the lower flange 44 in the vehicle vertical direction, is thermally welded to the upper surface 22A of the bottom wall 22. Further, as an example, an upper surface 46A, which is the surface on the upper side of the upper flange 46 in the vehicle vertical direction, is thermally welded to a lower surface 24A, which is the surface on the lower side of the upper wall 24 in the vehicle vertical direction. The thermal welding is a technology for joining thermoplastic resins to each other, and includes also ultrasonic welding, high-frequency welding and the like. In this way, the post portion 40 is joined to the bottom wall 22 and the upper wall 24. In other words, the post portion 40 is erected between the bottom wall 22 and the upper wall 24 along the vehicle vertical direction.

(Rib)

The rib 47 shown in FIG. 2 is a plate-shaped portion whose thickness direction is the vehicle front-back direction. The rib 47 connects the upper surface of the lower flange 44 and the outer surface of the lower-side upstanding portion 42A. Furthermore, the rib 47 is formed in a nearly right triangular shape, as viewed from the vehicle front-back direction. The rib 47 suppresses the deformation of the lower flange 44 and the lower-side upstanding portion 42A. In other words, the rib 47 resists an external force that is applied to the lower flange 44 and the lower-side upstanding portion 42A.

The rib 48 is a plate-shaped portion whose thickness direction is the vehicle front-back direction. The rib 48 connects the lower surface of the upper flange 46 and the outer surface of the upper-side upstanding portion 42B. Furthermore, the rib 48 is formed in a nearly right triangular shape, as viewed from the vehicle front-back direction. The rib 48 suppresses the deformation of the upper flange 46 and the upper-side upstanding portion 42B. In other words, the rib 48 resists an external force that is applied to the upper flange 46 and the upper-side upstanding portion 42B.

<Fragile Portion>

The fragile portion 50 is formed on the upper-side upstanding portion 42B. Specifically, as an example, the fragile portion 50 is formed at a nearly central portion of the upper-side upstanding portion 42B in the vehicle vertical direction. In other words, the fragile portion 50 is formed above the center of the post portion 40 in the vehicle vertical direction. As an example, the fragile portion 50 is formed such that a part of the upper-side upstanding portion 42B in the vehicle vertical direction is depressed toward the center in the vehicle width direction. Further, as an example, the fragile portion 50 is formed as a curved concave portion that is formed by gradually reducing the width of the upper-side upstanding portion 42B in the vehicle front-back direction.

Furthermore, as an example, the fragile portion 50 is formed such that the depression amount of one side in the vehicle front-back direction is nearly the same as the depression amount of the other side. Here, the above description is the description for the fragile portion 50 on the left wall 38. As for the fragile portion 50 on the back wall 39, the vehicle front-back direction as the depression direction is replaced with the vehicle width direction.

Figure 3:
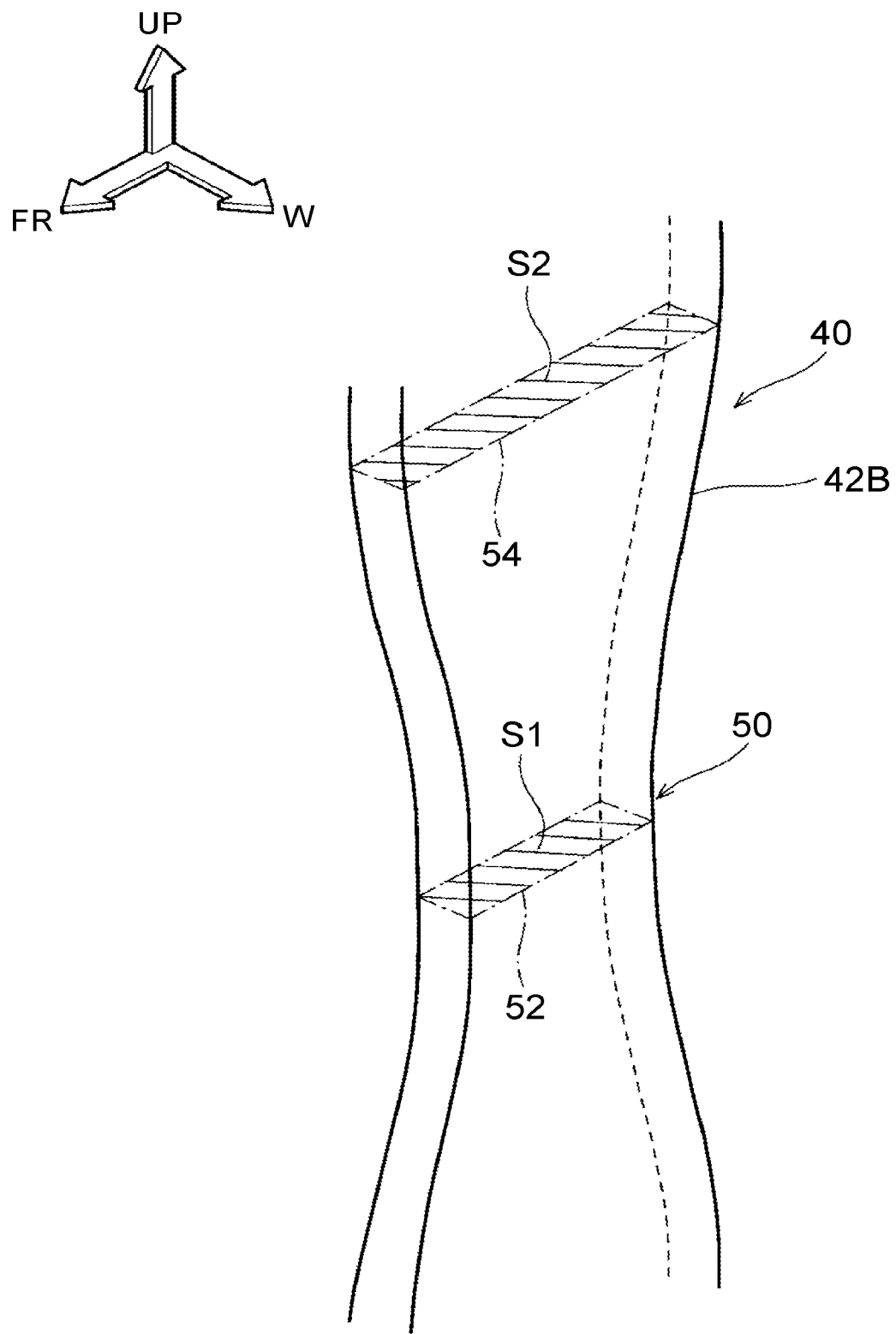
FIG. 3 is a perspective view of a fragile portion according to the first embodiment.

As shown in FIG. 3, the fragile portion 50 is a part where an area S1 of a section 52 orthogonal to the standing direction of the post portion 40 (the vehicle vertical direction) is smaller than an area S2 of a section 54 that is of sections orthogonal to the standing direction of the upper-side upstanding portion 42B and that has the largest section area. The section 52 and the section 54 are formed in a nearly rectangular shape, as viewed from the vehicle vertical direction. Here, the section 54 is an example of the different part.

The shape and size of the fragile portion 50 are set such that the fragile portion 50 can resist a compressive force or a tensile force to be applied to the joining portions between the post portion 40 and the tank body 20 (see FIG. 1) when the compressive force or the tensile force is a force having a magnitude in an allowable range. Further, the shape and size of the fragile portion 50 are set such that not the joining portions but the fragile portion 50 is broken when the compressive force or the tensile force to be applied to the joining portions between the post portion 40 and the tank body 20 has a magnitude beyond the allowable range.

[Operation]

Next, operations and effects of the fuel tank 10 according to the first embodiment will be described.

In the fuel tank 10 shown in FIG. 1, when the fuel A flows from an unillustrated supply port into the interior of the tank body 20, some of the fuel A is stored in the auxiliary storage portion 21B, and the remaining fuel is stored in the main storage portion 21A. Further, in the fuel tank 10, when the internal pressure of the tank body 20 fluctuates, the tank body 20 deforms. For example, when the temperature of the interior of the tank body 20 rises to higher than the external temperature, the fuel A evaporates and the interior of the tank body 20 becomes a positive pressure state where the internal pressure of the tank body 20 is higher than the atmospheric pressure, the tank body 20 expands as shown in FIG. 4B.

Figure 4A:
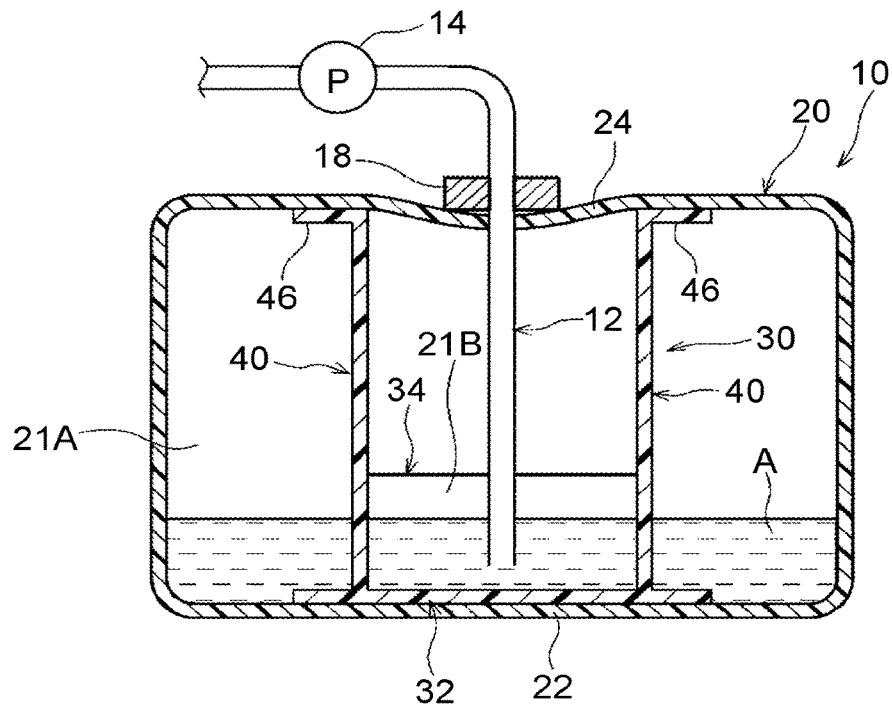
FIG. 4A is an explanatory diagram showing that the interior of the fuel tank according to the first embodiment is in a negative pressure state.
Figure 4B:
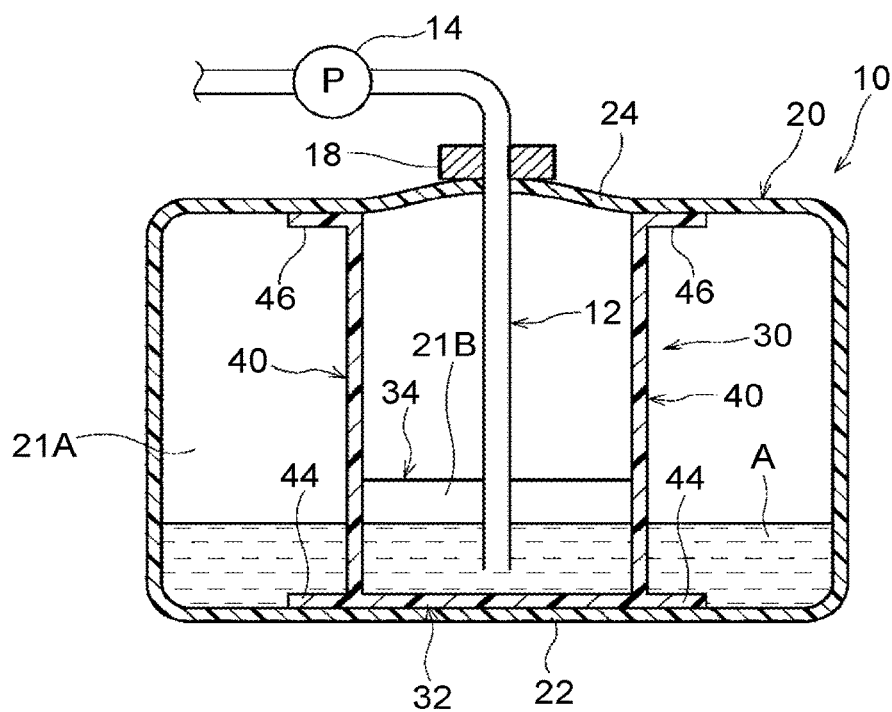
FIG. 4B is an explanatory diagram showing that the interior of the fuel tank according to the first embodiment is in a positive pressure state.

On the other hand, when the fuel A is fed by the pump module 14 and the internal pressure of the tank body 20 becomes a negative pressure state where the internal pressure of the tank body 20 is lower than the atmospheric pressure, the tank body 20 contracts (is depressed) as shown in FIG. 4A. Examples of the case where the interior of the tank body 20 becomes a negative pressure state include a case where the temperature of the interior of the tank body 20 decreases to lower than the external temperature, for example, in addition to the case where the fuel A is fed.

In the fuel tank 10, the post portion 40 is erected between the bottom wall 22 of the tank body 20 and the upper wall 24, and when the tank body 20 expands or is depressed, the post portion 40 resists the tensile force or the compressive force. Thereby, it is possible to suppress the deformation of the tank body 20. Particularly, at the portions where the post portion 40 is joined to the tank body 20, it is possible to suppress the fluctuation of the interval between the bottom wall 22 and the upper wall 24. Further, by the suppression of the deformation of the tank body 20, it is possible to suppress the removing of the sub-tank 30 from the bottom wall 22. Therefore, when the fuel A is fed from the sub-tank 30 by the pump module 14, it is possible to reduce the amount of the fuel A that cannot be fed.

Here, the post portion 40 is formed integrally with the wall portion 34 and is extended along the standing direction of the wall portion 34, and therefore, it is possible to suppress the deformation of the tank body 20 in a simple structure, compared to a configuration in which the post portion 40 and the wall portion 34 are separately provided.

Further, in the fuel tank 10, the post portion 40 includes the lower flange 44 and the upper flange 46, and therefore, the area (welding area) of the joining portions of the post portion 40 to the bottom wall 22 and the upper wall 24 is wider compared to a configuration in which there is no flange. Thereby, it is possible to suppress the deformation of the tank body 20, compared to the configuration in which there is no flange.

As shown in FIG. 2, in the post portion 40, the rib 47 and the rib 48 are formed, and therefore, it is hard for the upstanding portion 42 to be displaced relative to the lower flange 44 and the upper flange 46. Thereby, in the fuel tank 10, compared to a configuration in which the rib 47 and the rib 48 are not provided, it is possible to suppress the inclination of the post portion 40 relative to the standing direction (the vehicle vertical direction), and therefore, it is possible to suppress the deformation of the tank body 20 to which the post portion 40 is joined.

Further, in the fuel tank 10, the plurality of (three, as an example) post portions 40 are formed on the wall portion 34. Therefore, when the tank body 20 expands or contracts, it is possible to suppress the deformation of the tank body 20, compared to a configuration in which a single post portion 40 resists the tensile force or the compressive force.

Next, a case where a high load is input to the fuel tank 10 shown in FIG. 1, for example, due to collision of the vehicle will be described. In the fuel tank 10, in the case where a high load beyond the allowable range is input to the tank body 20, the fragile portion 50 (see FIG. 2) cannot resist the load so that the fragile portion 50 is broken, when the load is transmitted from the tank body 20 to the post portion 40. In the fuel tank 10, since the fragile portion 50 is broken in this way in the case where a high load is input to the tank body 20, an excessive stress is prevented from being concentrated on the joining part between the post portion 40 and the bottom wall 22 and the joining part between the post portion 40 and the upper wall 24. Thereby, it is possible to suitably maintain the durability of the joining portions between the tank body 20 and the post portion 40.

Second Embodiment

Next, a fuel tank 10 according to a second embodiment of the disclosure will be described. Here, for components and portions having the same functions as those of the above-described fuel tank 10 (see FIG. 1) according to the first embodiment, reference characters identical to the reference characters used in the first embodiment are assigned, and the description will be omitted.

Figure 5:
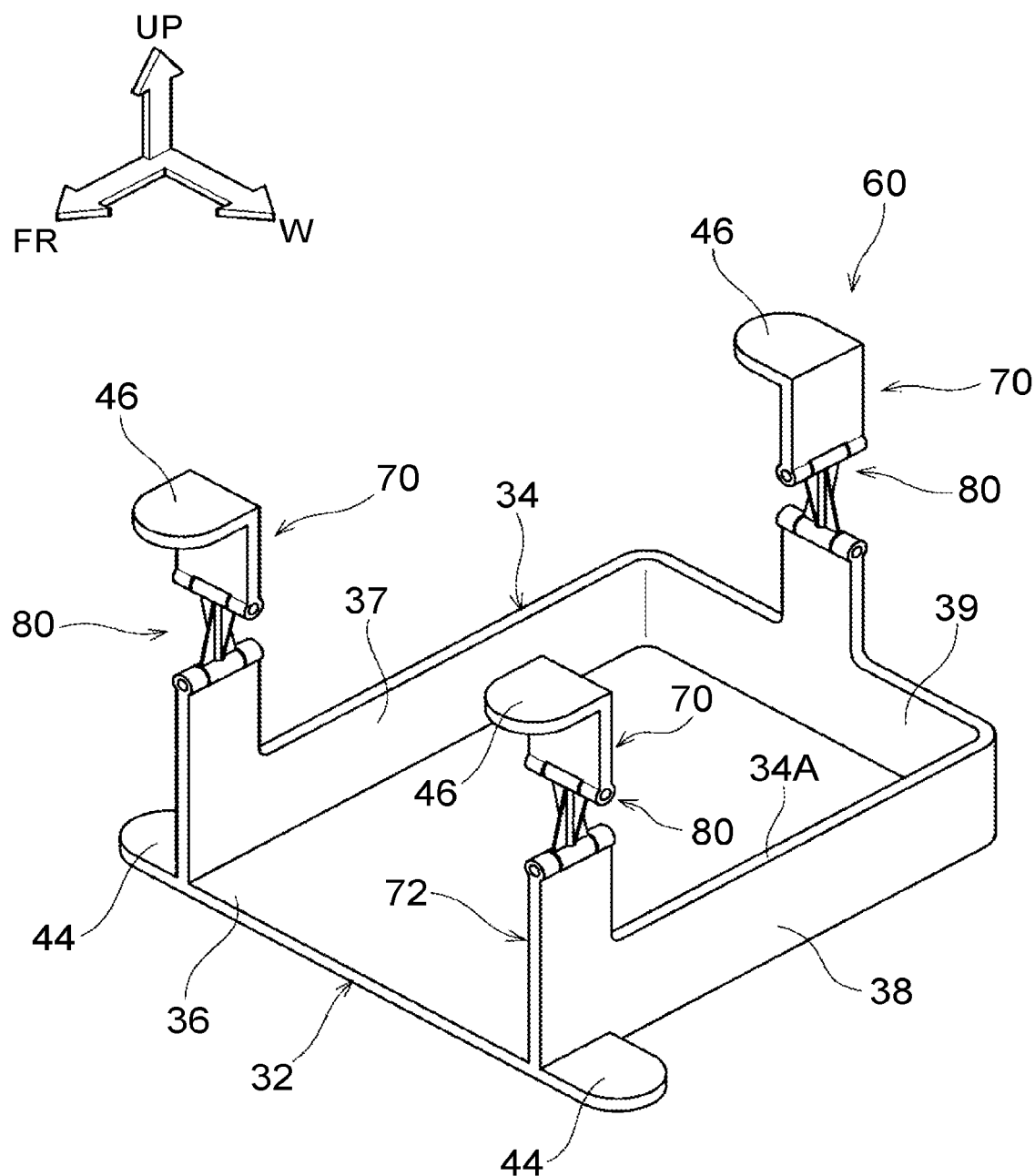
FIG. 5 is a perspective view of a sub-tank according to a second embodiment.

The fuel tank 10 according to the second embodiment includes the tank body 20 (see FIG. 1) and a sub-tank 60 (see FIG. 5). As an example, the sub-tank 60 is composed of a thermoplastic resin, and includes the lower wall 32, the wall portion 34, the opening portion 36, and post portions 70 (see FIG. 5).

<Post Portion>

As shown in FIG. 5, the post portions 70, as an example, are formed integrally with the wall portion 34, at the front end portion of the right wall 37, the front end portion of the left wall 38 and the central portion of the back wall 39 in the vehicle width direction. That is, as an example, three post portions 70 are formed. As an example, the three post portions 70 have the same configuration, except difference in disposing angle. Therefore, the description will be made for the post portion 70 formed integrally with the left wall 38, and the description of the other two post portions 70 will be omitted.

As an example, the post portion 70 is configured to include an upstanding portion 72, the lower flange 44 formed at the lower end of the upstanding portion 72 in the vehicle vertical direction, and the upper flange 46 formed at the upper end of the upstanding portion 72 in the vehicle vertical direction. On the upstanding portion 72, a displacement allowing portion 80 is provided. Details of the displacement allowing portion 80 will be described later. The post portion 70 is joined to the bottom wall 22 and the upper wall 24 (see FIG. 1). In other words, the post portion 70 is erected between the bottom wall 22 and the upper wall 24 along the vehicle vertical direction.

(Upstanding Portion)

Figure 6:
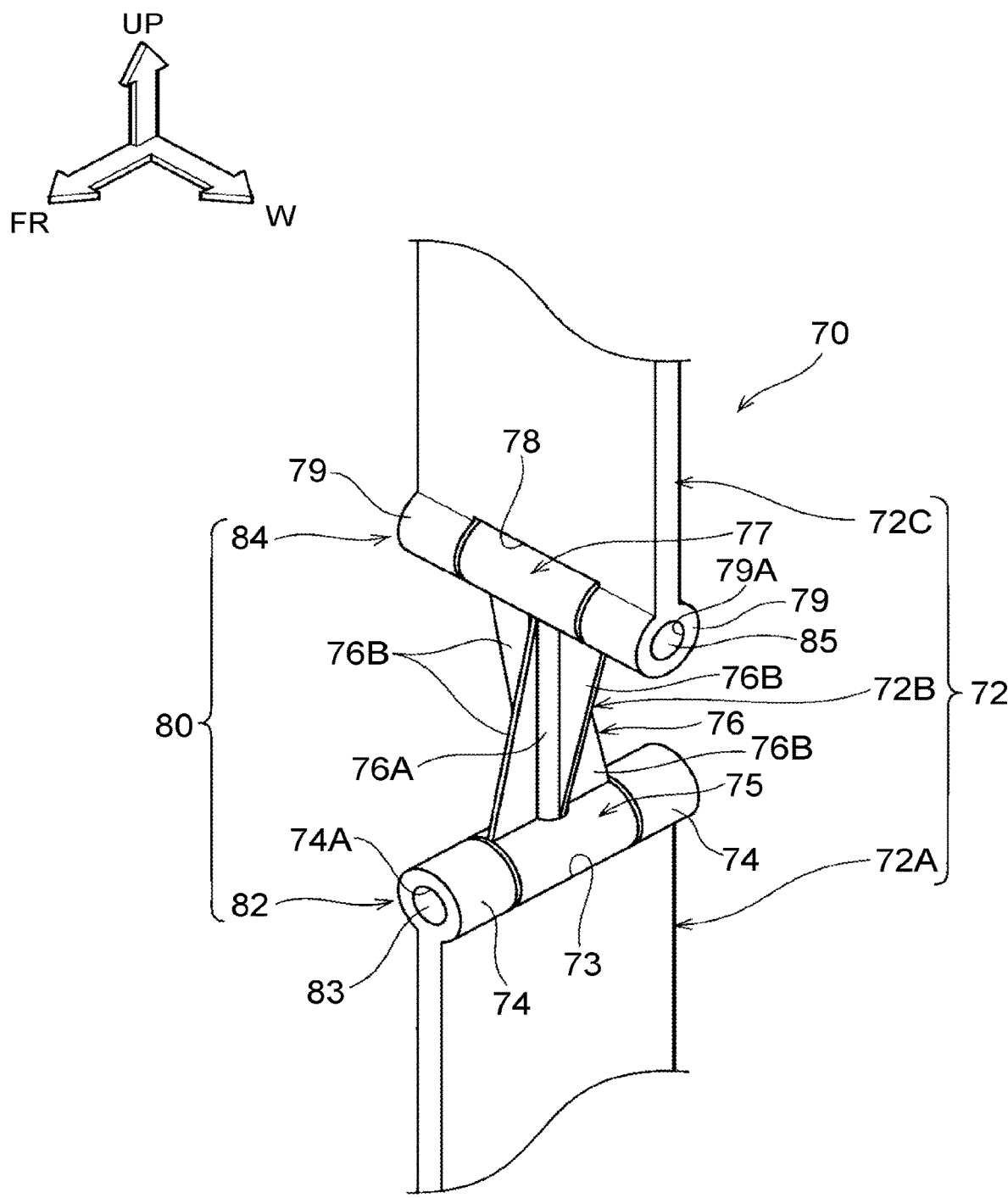
FIG. 6 is a partial enlarged view of a fragile portion and a displacement allowing portion of the sub-tank according to the second embodiment.

As shown in FIG. 6, the upstanding portion 72 is extended along the standing direction of the wall portion 34 (see FIG. 5). Here, the upstanding portion 72 is divided into a lower-side upstanding portion 72A, a connecting portion 72B and an upper-side upstanding portion 72C. The displacement allowing portion 80 is provided at a part where the upper end of the lower-side upstanding portion 72A and the lower end of the connecting portion 72B are jointed and a part where the upper end of the connecting portion 72B and the lower end of the upper-side upstanding portion 72C are jointed.

The lower-side upstanding portion 72A is a part of the upstanding portion 72 that is extended from the upper surface 22A (see FIG. 1) to the displacement allowing portion 80 above the upper end surface 34A (see FIG. 5) in the vehicle vertical direction, and is a part where the wall portion 34 (see FIG. 5) and the post portion 70 are integrated. The lower-side upstanding portion 72A is a plate-shaped portion having nearly the same thickness as the thickness of the wall portion 34. Furthermore, a concave shape portion 73 in which the upper side is opened as viewed from the vehicle width direction is formed at the upper end of the lower-side upstanding portion 72A. Two jointing portions 74 are formed at both outer sides of the concave shape portion 73 in the vehicle front-back direction. Each jointing portion 74 is formed in a nearly circularly cylindrical shape, as viewed from the vehicle front-back direction. In each jointing portion 74, a through-hole 74A that passes through the jointing portion 74 in the vehicle front-back direction is formed.

As an example, the connecting portion 72B is configured as a member that integrally includes a jointed portion 75, a columnar portion 76 and a jointed portion 77.

The jointed portion 75 is formed in a nearly circularly cylindrical shape, as viewed from the vehicle front-back direction. In the jointed portion 75, an unillustrated through-hole that passes through the jointed portion 75 in the vehicle front-back direction is formed. The length of the jointed portion 75 in the vehicle front-back direction is a length that allows the jointed portion 75 to be contained in the concave shape portion 73.

The columnar portion 76 is extended in a columnar shape to the upper side in the vehicle vertical direction, from a part that is a top portion of a peripheral wall of the jointed portion 75 as viewed from the vehicle front-back direction and that is a central portion of the jointed portion 75 in the vehicle front-back direction. Further, the upper end of the columnar portion 76 is connected to a part that is a bottom portion of a peripheral wall of the jointed portion 77 as viewed from the vehicle front-back direction and that is a central portion of the jointed portion 77 in the vehicle front-back direction. Specifically, the columnar portion 76 is configured by a nearly circularly columnar axis portion 76A that extends in the vehicle vertical direction and four ribs 76B that connect an outer peripheral surface of the axis portion 76A and the jointed portions 75, 77. The four ribs 76B are disposed at regular intervals in the peripheral direction of the axis portion 76A. Each rib 76B is formed in a nearly right triangular shape, as viewed from the peripheral direction of the axis portion 76A.

The jointed portion 77 is formed in a nearly circularly cylindrical shape, as viewed from the vehicle width direction. In the jointed portion 77, an unillustrated through-hole that passes through the jointed portion 77 in the vehicle width direction is formed. As an example, the length of the jointed portion 77 in the vehicle width direction is nearly the same as the length of the jointed portion 75 in the vehicle front-back direction. The jointed portion 77 is disposed so as to be nearly orthogonal to the jointed portion 75, as viewed from the vehicle front-back direction.

The upper-side upstanding portion 72C is a part that is positioned in a range on the upper side of the displacement allowing portion 80. The upper-side upstanding portion 72C is a plate-shaped portion having nearly the same thickness as the thickness of the wall portion 34 (see FIG. 5). Furthermore, the upper-side upstanding portion 72C is disposed so as to be nearly orthogonal to the lower-side upstanding portion 72A, as viewed from the vehicle vertical direction. Furthermore, a concave shape portion 78 in which the lower side is opened as viewed from the vehicle width direction is formed at the lower end of the upper-side upstanding portion 72C. Two jointing portions 79 are formed at both outer sides of the concave shape portion 78. The interval of the concave shape portion 78 in the vehicle front-back direction is set so as to have a length that allows the jointed portion 77 to be contained. Each jointing portion 79 is formed in a nearly circularly cylindrical shape, as viewed from the vehicle front-back direction. In each jointing portion 79, a through-hole 79A that passes through the jointing portion 79 in the vehicle front-back direction is formed.

<Displacement Allowing Portion>

The displacement allowing portion 80 is provided above the center of the post portion 70 in the vehicle vertical direction. As shown in FIG. 6, the displacement allowing portion 80, as an example, is configured by a lower-side hinge portion 82 that is provided on the lower side in the vehicle vertical direction and an upper-side hinge portion 84 that is provided above the lower-side hinge portion 82.

(Lower-Side Hinge Portion)

As an example, the lower-side hinge portion 82 is configured by the two jointing portions 74, the jointed portion 75 and a pin 83. The pin 83 is a circularly columnar member whose axial direction is the vehicle front-back direction, and has a size that allows the insertion into the through-hole 74A and the through-hole of the jointed portion 75. By inserting the pin 83 into the through-hole 74A and the through-hole of the jointed portion 75, the two jointing portions 74 and the jointed portion 75 are jointed. Thereby, the connecting portion 72B can pivot around the pin 83 relative to the lower-side upstanding portion 72A.

(Upper-Side Hinge Portion)

As an example, the upper-side hinge portion 84 is configured by the two jointing portions 79, the jointed portion 77 and a pin 85. The pin 85 is a circularly columnar member whose axial direction is the vehicle width direction, and has a size that allows the insertion into the through-hole 79A and the through-hole of the jointed portion 77. By inserting the pin 85 into the through-hole 79A and the through-hole of the jointed portion 77, the two jointing portions 79 and the jointed portion 77 are jointed. Thereby, the upper-side upstanding portion 72C can pivot around the pin 85 relative to the connecting portion 72B.

[Comparative Example]

Figure 7A:
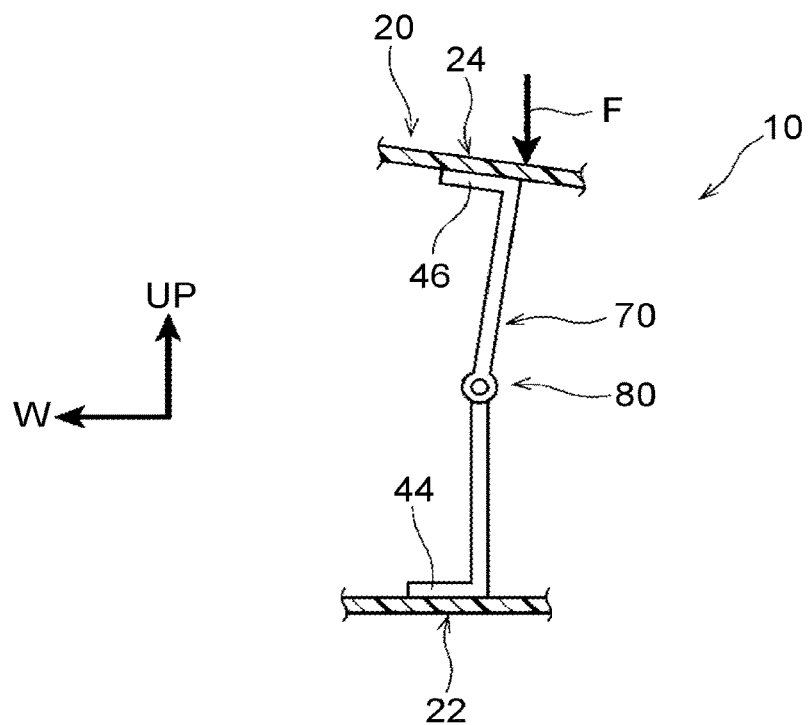
FIG. 7A is a schematic view showing a state where displacement of an upper wall is allowed by the displacement allowing portion of a post portion according to the second embodiment.
Figure 7B:
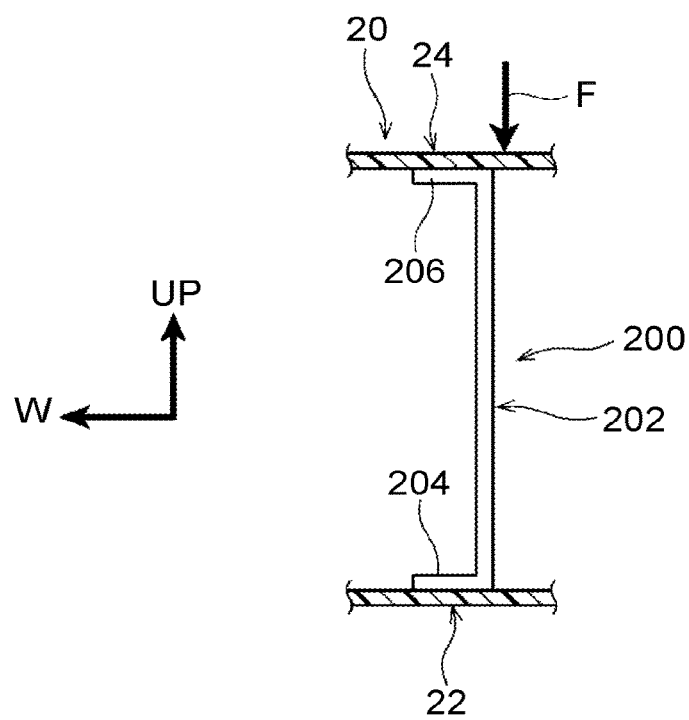
FIG. 7B is a schematic view showing a state where the displacement of the upper wall is not allowed by a post portion according to a comparative example.

FIG. 7B shows a post portion 200 according to a comparative example. The post portion 200 is extended in the vehicle vertical direction. The post portion 200 includes an upstanding portion 202, a lower flange 204 that projects from the lower end of the upstanding portion 202 in the vehicle width direction, and an upper flange 206 that projects from the upper end of the upstanding portion 202 in the vehicle width direction. The lower flange 204 is welded to the bottom wall 22. The upper flange 206 is welded to the upper wall 24.

In the post portion 200 according to the comparative example, in the case where a load F from the upper wall 24 of the tank body 20 is applied due to the collision of the vehicle or the like and the upper wall 24 is displaced relative to the bottom wall 22, the post portion 200 restricts the disposition of the upper wall 24 relative to the bottom wall 22. Thereby, there is a possibility that an excessive stress is concentrated on the joining part between the post portion 200 and the upper wall 24 and the joining part between the post portion 200 and the bottom wall 22. Here, the load F from the upper wall 24 includes a load from a direction perpendicular to a plane of the upper wall 24 (the vehicle vertical direction).

[Operation]

Next, operations and effects of the fuel tank 10 according to the second embodiment will be described. For the same effects as those of the fuel tank 10 according to the first embodiment, the description will be omitted in some cases.

In the fuel tank 10 according to the second embodiment shown in FIG. 5, when the tank body 20 (see FIG. 1) expands or is depressed, the post portion 70 resists the tensile force or the compressive force, and therefore, it is possible to suppress the deformation of the tank body 20. Further, the post portion 70 is formed integrally with the wall portion 34 and is extended along the standing direction of the wall portion 34, and therefore, it is possible to suppress the deformation of the tank body 20 in a simple structure, compared to a configuration in which the post portion 70 and the wall portion 34 are separately provided.

Further, in the fuel tank 10 according to the second embodiment, in the case where a load is applied to the tank body 20 and the upper wall 24 (see FIG. 1) is displaced relative to the bottom wall 22 of the tank body 20, the displacement allowing portion 80 of the post portion 70 allows the displacement of the upper wall 24 relative to the bottom wall 22. Specifically, in the displacement allowing portion 80 shown in FIG. 6, in the case where a load in the vehicle front-back direction is applied to the upper-side upstanding portion 72C, the upper-side upstanding portion 72C is displaced (pivots) relative to the connecting portion 72B, while the lower-side upstanding portion 72A and the connecting portion 72B are integrated. In the case where a load in the vehicle width direction is applied to the upper-side upstanding portion 72C, the upper-side upstanding portion 72C and the connecting portion 72B are displaced (pivot) relative to the lower-side upstanding portion 72A, while the upper-side upstanding portion 72C and the connecting portion 72B are integrated.

FIG. 7A, in which the displacement allowing portion 80 is regarded as a single hinge portion, is a schematic view showing a state where the load F from the upper wall 24 (from the direction perpendicular to the plane of the upper wall 24) is applied to the post portion 70 and the upper wall 24 is displaced relative to the bottom wall 22, as an example. As described above, in the case where the load F is applied to the tank body 20 and the upper wall 24 is displaced relative to the bottom wall 22 of the tank body 20, the displacement allowing portion 80 makes the part above the displacement allowing portion 80 of the post portion 70 pivot relative to the part below the displacement allowing portion 80. That is, the displacement allowing portion 80 allows the displacement of the upper wall 24 relative to the bottom wall 22. Therefore, an excessive stress is prevented from being concentrated on the joining part between the post portion 70 and the upper wall 24 and the joining part between the post portion 70 and the bottom wall 22. Thereby, it is possible to suitably maintain the durability of the joining portions between the post portions 70 and the tank body 20.

As described above, in the displacement allowing portion 80 shown in FIG. 6, the lower-side hinge portion 82 pivots around the pin 83 whose axial direction is the vehicle front-back direction, and the upper-side hinge portion 84 pivots around the pin 85 whose axial direction is the vehicle width direction. Thereby, regardless of whether the upper wall 24 (see FIG. 1) is displaced relative to the bottom wall 22 (see FIG. 1) in the vehicle front-back direction or in the vehicle width direction, it is possible to prevent an excessive stress from being concentrated on the joining portion between the post portion 70 and the tank body 20 (see FIG. 1).

Third Embodiment

Next, a fuel tank according to a third embodiment of the disclosure will be described. Here, for components and portions having the same functions as those of the above-described fuel tank 10 according to the first or second embodiment, reference characters identical to the reference characters used in the first or second embodiment are assigned, and the description will be omitted.

Figure 8:
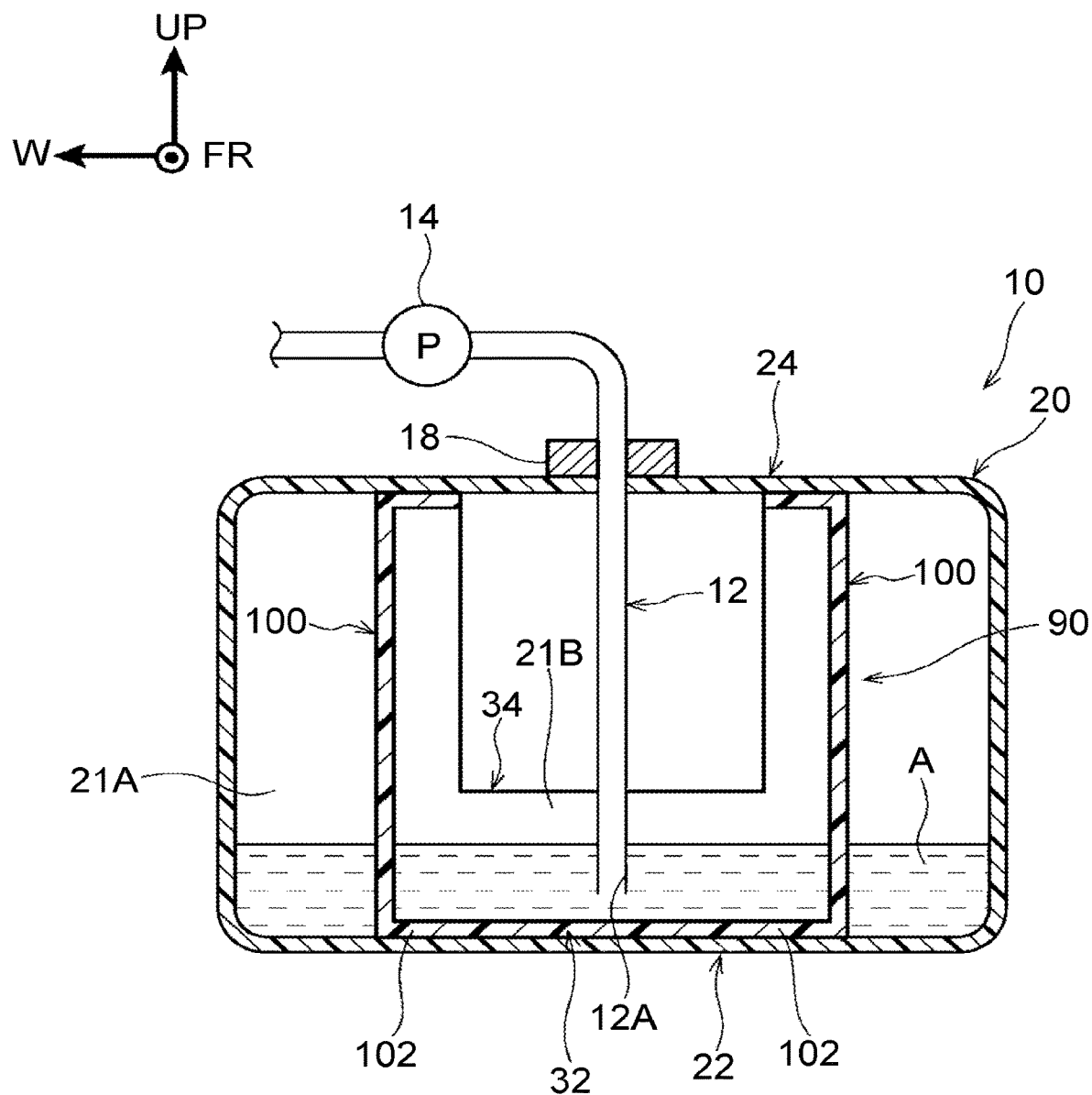
FIG. 8 is a longitudinal sectional view of a fuel tank according to a third embodiment.

A fuel tank 10 according to the third embodiment shown in FIG. 8 includes the tank body 20 and a sub-tank 90.

Figure 9:
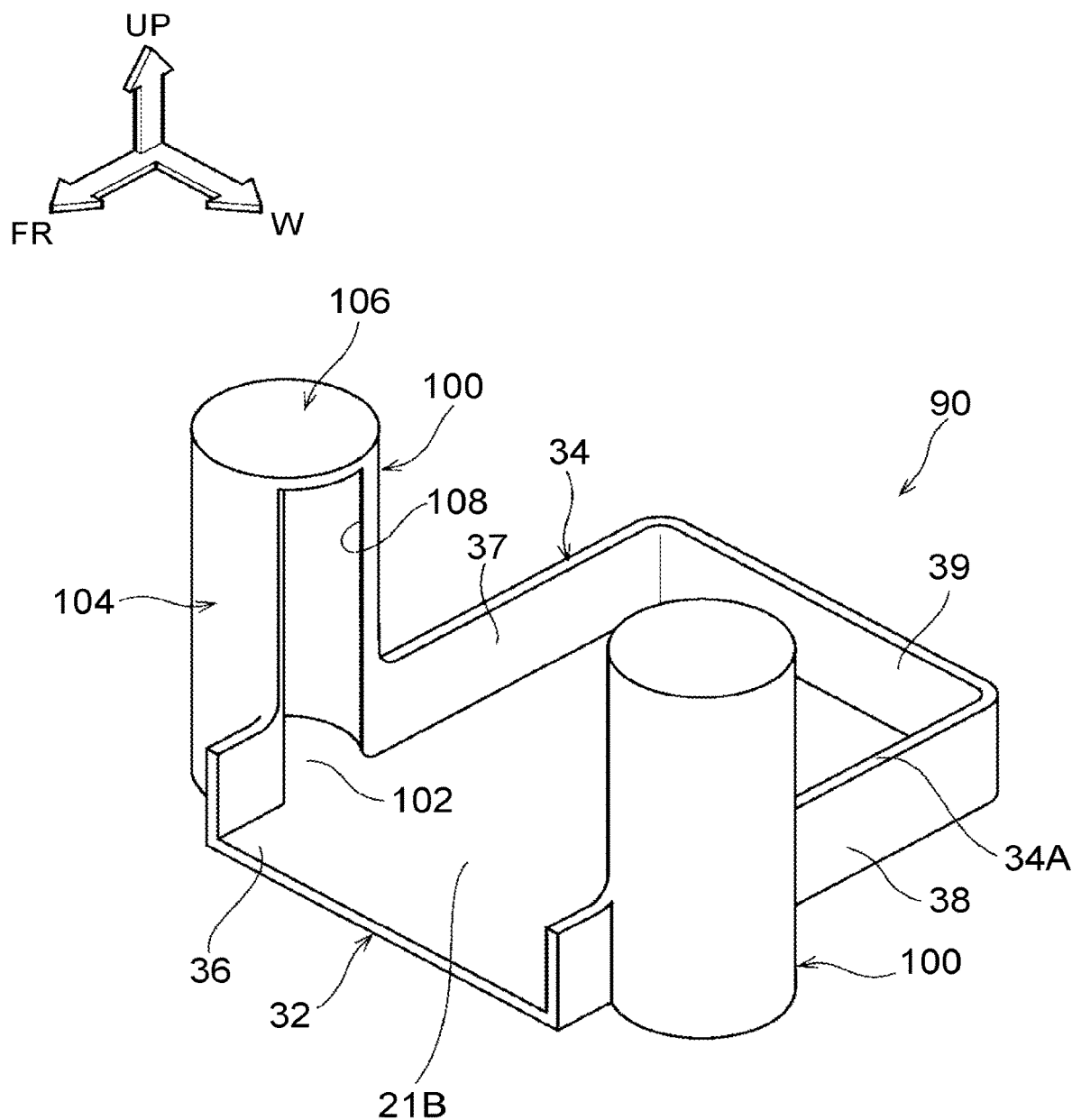
FIG. 9 is a perspective view of a sub-tank according to the third embodiment.

As an example, the sub-tank 90 shown in FIG. 9 is composed of a thermoplastic resin, and includes the lower wall 32, the wall portion 34, the opening portion 36, and post portions 100.

<Post Portion>

As an example, the post portions 100 are formed integrally with the wall portion 34, at the front end portion of the right wall 37 and the front end portion of the left wall 38. That is, as an example, two post portions 100 are formed. The two post portions 100 have the same configuration. Therefore, the description will be made for the post portion 100 formed integrally with the right wall 37, and the description of the post portion 100 on the left wall 38 will be omitted.

The post portion 100 is formed in a nearly circularly cylindrical shape in which the axial direction of the central axis is along the vehicle vertical direction, as an example of the cylindrical shape. Specifically, the post portion 100 is configured by a lower wall portion 102, a peripheral wall portion 104 and an upper wall portion 106. The lower wall portion 102 is formed in a nearly circular shape, as viewed from the vehicle vertical direction, and is a disk-shaped part that is integrated with the lower wall 32.

The peripheral wall portion 104 is a part that upstands from the outer edge of the lower wall portion 102 in the vehicle vertical direction, as an example of the wall of the post portion 100. The peripheral wall portion 104 is formed in a nearly ring shape, as viewed from the vehicle vertical direction. Furthermore, a lower portion of the peripheral wall portion 104 is integrated with the right wall 37. In addition, an inflow port 108 into which the fuel A (see FIG. 8) in the sub-tank 90 flows is formed on the peripheral wall portion 104.

As an example, the inflow port 108 is formed from the lower end of the peripheral wall portion 104 to the upper end, and is opened toward the inside of the sub-tank 90 (the side of the auxiliary storage portion 21B). The inflow port 108 is formed in a rectangular shape that is lengthened in the vehicle vertical direction, as viewed from the vehicle width direction. The upper wall portion 106 is formed in a nearly circular shape, as viewed from the vehicle vertical direction, and closes the upper end of the peripheral wall portion 104. The post portion 100 stores the fuel A (see FIG. 8) that flows from the auxiliary storage portion 21B through the inflow port 108 into the inside of the peripheral wall portion 104. That is, the post portion 100 configures a third storage portion for the fuel A.

As shown in FIG. 8, in the post portion 100, the lower wall portion 102 is welded (joined) to the bottom wall 22, and the upper wall portion 106 is welded (joined) to the upper wall 24. In other words, the post portion 100 is erected between the bottom wall 22 and the upper wall 24 along the vehicle vertical direction.

[Operation]

Next, operations and effects of the fuel tank 10 according to the third embodiment will be described.

In the fuel tank 10 according to the third embodiment shown in FIG. 8, when the tank body 20 expands or is depressed, the post portion 100 resists the tensile force or the compressive force, and therefore, it is possible to suppress the deformation of the tank body 20. Further, the post portion 100 is formed integrally with the wall portion 34 and is extended along the standing direction of the wall portion 34, and therefore, it is possible to suppress the deformation of the tank body 20 in a simple structure, compared to a configuration in which the post portion 100 and the wall portion 34 are separately provided.

Furthermore, in the fuel tank 10 according to the third embodiment, the fuel A is stored also in the interior of the post portion 100, and therefore, it is possible to increase the amount of the fuel A that is stored in the sub-tank 90, compared to a configuration in which the post portion 100 is solid.

<Modifications>

The disclosure is not limited to the above embodiments.

(First Modification)

Figure 10A:
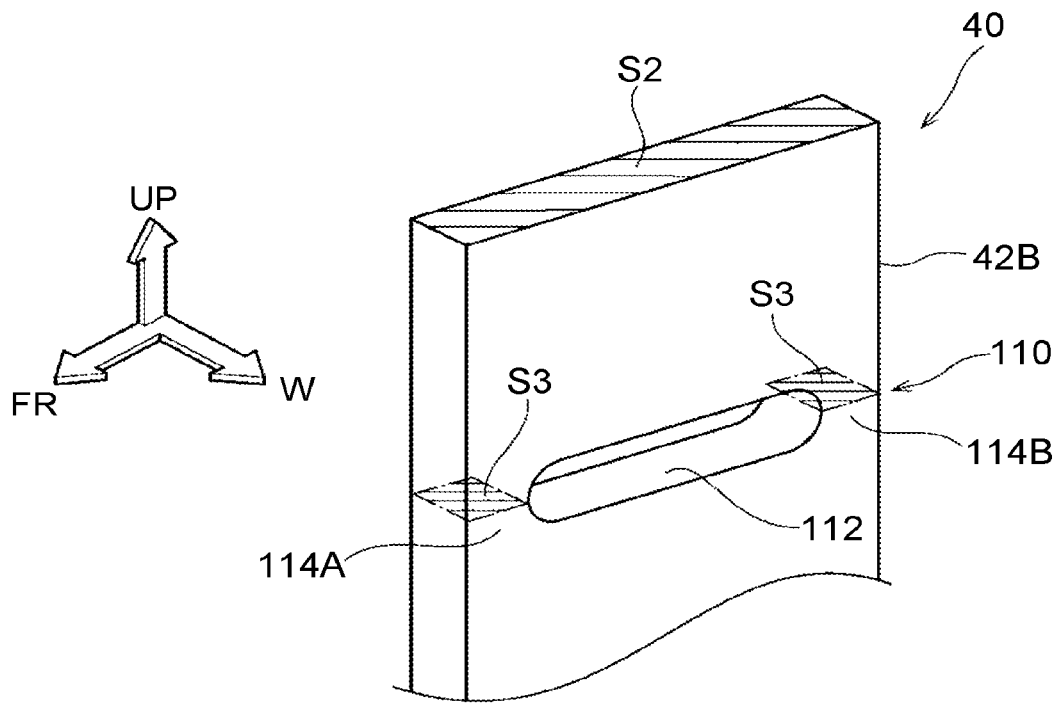
FIG. 10A is a perspective view showing a fragile portion according to a first modification.

FIG. 10A shows a fragile portion 110 in a first modification. The fragile portion 110 is configured by both outside portions 114A, 114B in the vehicle front-back direction with respect to a through-hole 112 that passes through the upper-side upstanding portion 42B in the vehicle width direction. A total area 2×S3 of sections that are of both outside portions 114A, 114B and that are orthogonal to the vehicle vertical direction is smaller than an area S2 of a section that is of a different part of the upper-side upstanding portion 42B and that is orthogonal to the vehicle vertical direction. In the fragile portion 110, when a high load is input to the tank body 20 (see FIG. 1), the fragile portion 110 is broken. Therefore, an excessive stress is prevented from being concentrated on the joining part between the post portion 40 and the bottom wall 22 (see FIG. 1) and the joining part between the post portion 40 and the upper wall 24 (see FIG. 1). Thereby, it is possible to suitably maintain the durability of the joining portions between the post portion 40 and the tank body 20.

(Second Modification)

Figure 10B:
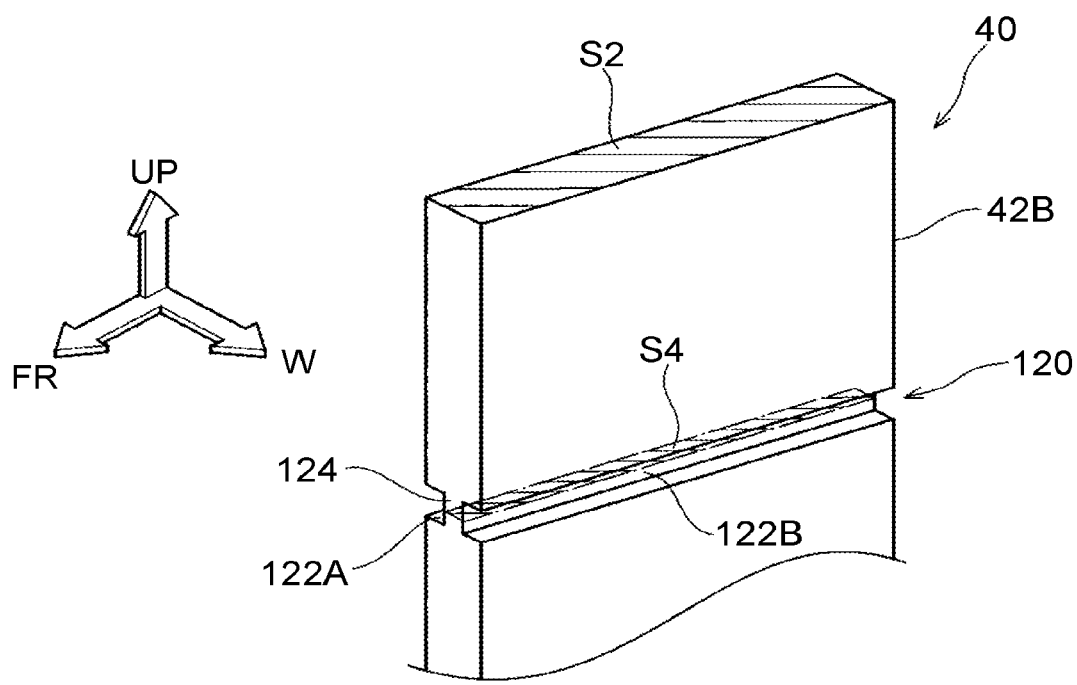
FIG. 10B is a perspective view showing a fragile portion according to a second modification.

FIG. 10B shows a fragile portion 120 in a second modification. The fragile portion 120 is configured by a longitudinal wall portion 124 excluding female beads 122A, 122B that are depressed from one side and the other side of the upper-side upstanding portion 42B in the vehicle width direction toward the center in the vehicle width direction. An area S4 of a section that is of the longitudinal wall portion 124 and that is orthogonal to the vehicle vertical direction is smaller than the area S2 of a section that is of the upper-side upstanding portion 42B and that is orthogonal to the vehicle vertical direction. In the fragile portion 120, when a high load is input to the tank body 20 (see FIG. 1), the fragile portion 120 is broken. Therefore, an excessive stress is prevented from being concentrated on the joining part between the post portion 40 and the bottom wall 22 (see FIG.

1) and the joining part between the post portion 40 and the upper wall 24 (see FIG. 1). Thereby, it is possible to suitably maintain the durability of the joining portions between the post portion 40 and the tank body 20.

(Third Modification)

Figure 11:
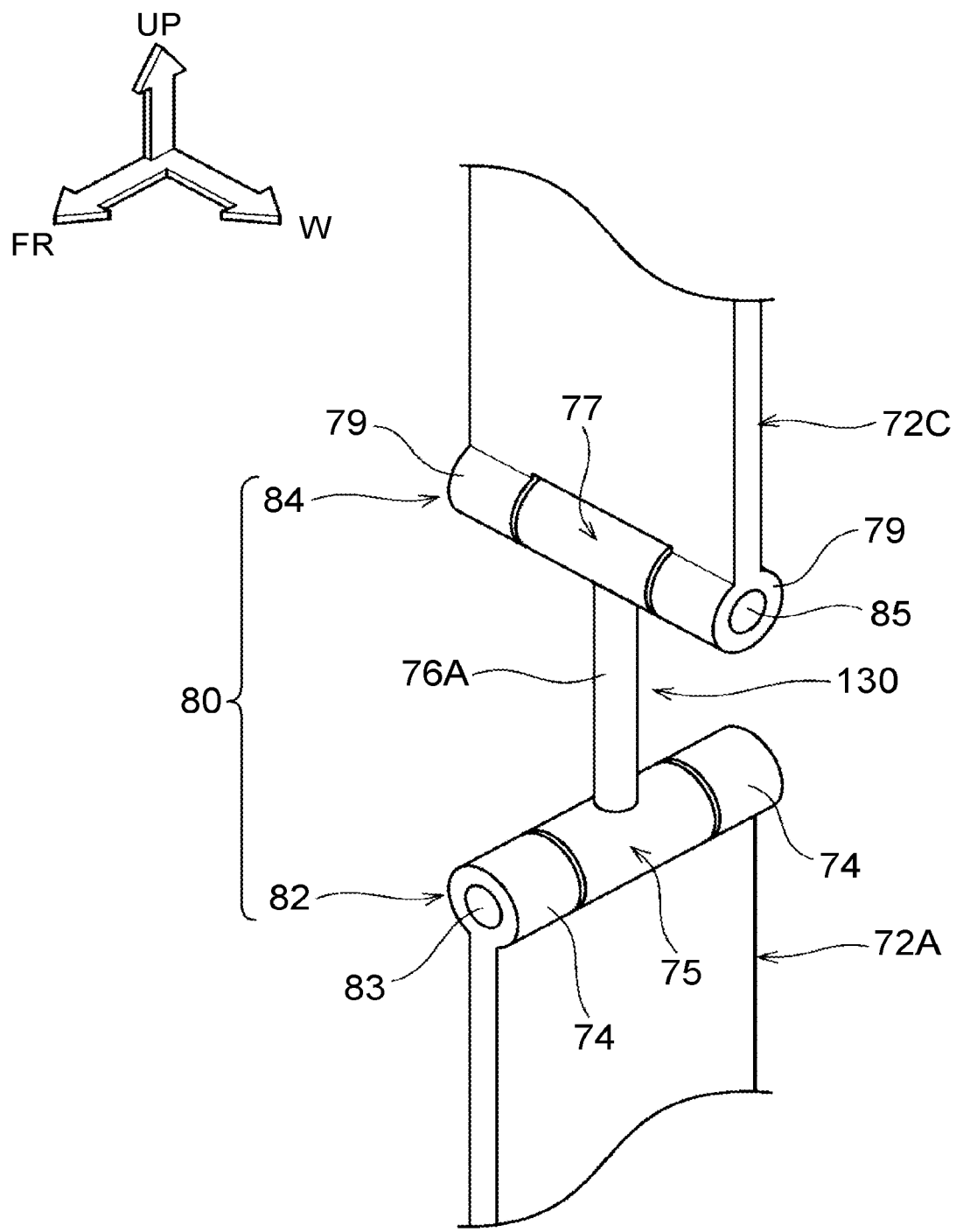
FIG. 11 is a partial enlarged view of a fragile portion and a displacement allowing portion according to a third modification.

FIG. 11 shows a fragile portion 130 in a third modification. The fragile portion 130 is a part configured to exclude the four ribs 76B (see FIG. 6) in the post portion 70 (see FIG. 6) according to the second embodiment and to include only the axis portion 76A. By making the axis portion 76A function as the fragile portion 130 in this way, an excessive stress is prevented from being concentrated on the joining part between the post portion and the bottom wall 22 (see FIG. 1) and the joining part between the post portion and the upper wall 24 (see FIG. 1). Thereby, it is possible to suitably maintain the durability of the joining portions between the post portion 70 and the tank body 20. Here, the configuration in FIG. 11 is a configuration of including both the fragile portion 130 and the displacement allowing portion 80. The displacement allowing portion 80 allows the relative displacement between the bottom wall 22 and the upper wall 24, and when a high load is input to the fuel tank 10 (see FIG. 1), the axis portion 76A is broken.

(Other Modifications)

The tank body 20 is not limited to a tank body made of a resin, and may be made of a metal (for example, iron).

The number of the post portions 40, 70, 100 is not limited to two or three, and may be one, or four or more.

In the post portion 100 of the sub-tank 90 according to the third embodiment, the post portion 100 may be provided below the center in vehicle vertical direction, and the upstanding portion 42 may be provided above the center. Further, on the upstanding portion 42, the fragile portion 130 may be formed and the displacement allowing portion 80 may be provided.

The displacement allowing portion 80 is not limited to a configuration of including both the lower-side hinge portion 82 and the upper-side hinge portion 84, and may be configured to include only one of them.

The sub-tank 30, 60, 90 may be configured such that the bottom wall 22 of the tank body 20 serves also as the lower wall 32 of the sub-tank 30, 60, 90. That is, the sub-tank 30, 60, 90 may be configured such that the wall portion 34 stands on the bottom wall 22 and the lower wall 32 does not exist. In other words, the "configuration in which the wall portion 34 stands on the bottom wall 22 of the tank body 20" includes a configuration in which the wall portion 34 stands directly on the bottom wall 22 and a configuration in which the lower wall 32 is provided on the bottom wall 22 and the wall portion 34 stands on the lower wall 32.

Thus, the fuel tanks according to the embodiments and modifications of the disclosure have been described. Naturally, the embodiments and the modifications may be appropriately combined to be used, and various aspects can be carried out without departing from the spirit of the disclosure.

What is claimed is:

1. A fuel tank comprising:
a tank body including a bottom wall, a lateral wall and an upper wall, the tank body storing fuel in an interior surrounded by the bottom wall, the lateral wall and the upper wall; and
a sub-tank storing a part of the fuel, the sub-tank including a wall portion, an opening portion and a post portion,
the wall portion standing on the bottom wall and extending toward the upper wall,
the opening portion being provided in the wall portion and being a portion in which the fuel flows,
the post portion being provided integrally with the wall portion, being extended along a height direction of the wall portion from the bottom wall and being joined to the bottom wall and the upper wall,
the post portion includes a fragile portion where an area of a section orthogonal to an extending direction of the post portion is smaller than a section area of parts of the post portion other than the fragile portion, and
when a direction from the bottom wall toward the upper wall is an upward direction and a direction from the upper wall toward the bottom wall is a downward direction, the post portion includes a first rib at a portion below the fragile portion and a second rib at a portion above the fragile portion, the first rib extending in an up-down direction, the second rib extending in the up-down direction.

2. The fuel tank according to claim 1, wherein
the post portion includes a displacement allowing portion configured to allow displacement of the upper wall relative to the bottom wall when a load from the upper wall of the tank body is applied.

3. The fuel tank according to claim 1, wherein
the post portion has a cylindrical shape, and an inflow port into which the fuel in the sub-tank flows is provided on a wall of the post portion.

4. The fuel tank according to claim 1, wherein
when a direction from the bottom wall toward the upper wall is an upward direction and a direction from the upper wall toward the bottom wall is a downward direction,
the post portion includes a flange that is provided at an end portion of the post portion in the upward direction and that is joined to the upper wall.

5. The fuel tank according to claim 1, wherein
when a direction from the bottom wall toward the upper wall is an upward direction and a direction from the upper wall toward the bottom wall is a downward direction,
the fragile portion is positioned above an upper edge portion of the wall portion.

6. The fuel tank according to claim 1, wherein
a plurality of the post portions are provided on the wall portion.

* * * * *